United States Patent

Koshevoi et al.

[11] 4,199,874
[45] Apr. 29, 1980

[54] TARGET SIMULATOR

[76] Inventors: Anatoly A. Koshevoi, Tverskoi Tupik, 9, kv. 62; Mikhail M. Kanaikin, prospect Korneichuka, 7, kv. 201; Viktor J. Lapy, ulitsa Chekistov, 24, kv. 16; Boris P. Chernov, prospekt 40-letia Oktyabrya, 100, kv. 228, all of Kiev, U.S.S.R.

[21] Appl. No.: 859,448

[22] Filed: Dec. 12, 1977

[30] Foreign Application Priority Data

Dec. 27, 1976 [SU] U.S.S.R. .............................. 2436104[I]

[51] Int. Cl.$^2$ .................................................. G01S 9/00
[52] U.S. Cl. ......................................................... 35/10.4
[58] Field of Search ......................................... 35/10.4

[56] References Cited
U.S. PATENT DOCUMENTS

| | | | |
|---|---|---|---|
| 3,123,659 | 3/1964 | Fontaine et al. | 35/10.4 |
| 3,374,481 | 3/1968 | Lupinetti | 35/10.4 X |
| 3,514,521 | 5/1970 | Burchard et al. | 35/10.4 |
| 3,571,479 | 3/1971 | Hujar | 35/10.4 |
| 3,641,485 | 2/1972 | Murphree et al. | 35/10.4 X |
| 3,783,172 | 1/1974 | Bernstein | 35/10.4 |

Primary Examiner—Malcolm F. Hubler
Attorney, Agent, or Firm—Lackenbach, Lilling & Siegel

[57] ABSTRACT

The proposed simulator of a target which moves relative to a moving object comprises a synchronization means to form signals corresponding to the variable azimuth of the direction of space, scanned by radar installed on the object and to the variable distance of scanned space points; and a group of transducers to form signals which carry information on the course and speed of the object. The transducers are connected to a channel for forming a signal to simulate the target. The channel comprises a group of transducers to form signals carrying information on the true course and actual speed of the target, and a computer to form signals carrying information on the azimuth of the target and the distance between the target and the object. The channel further includes logical circuits to form pulse signals whose timing in relation to respective reference pulses corresponds to the azimuth of and the distance to the target. The channel still further includes a logical circuit for forming a signal to simulate the target. The invention makes it possible to represent complicated navigation situations on situation displays incorporated in surface craft collision avoidance systems.

5 Claims, 7 Drawing Figures

TARGET SIMULATOR

FIELD OF THE INVENTION

The present invention relates to control systems and, more particularly, to a simulator of a target moving in relation to a moving object.

The invention is applicable to collision avoidance systems of vessels and to navigation trainers.

BACKGROUND OF THE INVENTION

The basic problem involved in the designing of a simulator of a target moving with respect to an object is to form target simulation signals with due regard for simultaneous motion of the target and object, at which the radar is installed, as well as with due regard for changes in the course and speed of both the target and object.

This problem is faced by designers of collision avoidance systems for moving objects, for example, seagoing vessels, and of navigation trainers capable of representing complicated situations involved in collision avoidance maneuvers.

DESCRIPTION OF THE PRIOR ART

There is known a target simulator which makes it possible to simulate radar signals reflected from a target moving in relation to an object, from which the target is tracked. The target simulator under review comprises a synchronization means; two logical circuits, one of which forms a signal corresponding to the azimuth of the target, and the other of which forms a signal corresponding to the distance between the target and the object; and a third logical circuit to form a target simulating signal.

The synchronization means comprises a counter of pulses corresponding to interrogation pulses of the radar, whose repetition period corresponds to the specified azimuth angle. The counting input of the counter is connected to a control circuit at whose inputs there are applied reference azimuth calculation pulses and pulses corresponding to interrogation pulses of the radar. At the output of the counter, which is one of the outputs of the synchronization means, there is formed a signal which is the alternate azimuth code. The synchronization means further includes an internal (or external) high-frequency master oscillator which may be a quartz crystal oscillator serving to produce distance clock pulses whose repetition frequency corresponds to a certain distance, for example, one sixteenth of a nautical mile. The oscillator comprises an output signal gating circuit. The output of the oscillator is coupled via a switch to a distance clock pulse counter whose first output is connected to the inhibiting input of the gating circuit at whose enabling input there are applied reference distance count pulses. A second output of the clock distance pulse counter is a second output of the synchronization means, at which there is produced a signal which is the alternate distance code.

The logical circuit for forming a signal corresponding to the azimuth of the target relative to the object from which the target is tracked comprises an azimuth comparator. When comparing the alternate azimuth code with the target azimuth code set by the comparator's switches, said comparator produces a pulse whose timing in relation to the reference azimuth count pulse corresponds to the azimuth of the target. The comparator's input is connected to one of the outputs of the synchronization means; the comparator's output is the output of the logical circuit for forming a signal corresponding to the azimuth of the target in relation to the object from which the target is tracked.

The logical circuit for forming a signal corresponding to the distance between the target and the object comprises a code comparison circuit, one of whose inputs is connected to the output of the distance clock pulse counter of the synchronization means, a second input of said code comparison circuit being connected to an output of a register intended to store and change a preset target distance code. A first input of the register is connected to a switch serving as a unit for producing a code corresponding to the initial range, to whose input there are applied reference azimuth count pulses. A second input of the register is coupled via the switch to the output of a generator of a signal corresponding to the change in the distance to the target during a single scanning period of the radar. A first input of said generator is connected to an output of a switch which serves to set a code corresponding to the change in the distance to the target during a single scanning period of the radar. A second input of the generator is connected to an output of the code comparison circuit whose second output is the output of the logical circuit for forming a signal corresponding to the distance between the target and the object.

The logical circuit for forming a target simulating signal comprises a pulse counter for counting the pulses of a pulse packet reflected from the target. The counter serves to count output pulses of the code comparison circuit of the logical circuit for forming a signal corresponding to the distance to the target. The logical circuit further includes a comparator of the duration of the pulse packet of the signal reflected from the target, which produces at its output a pulse at the moment the code at the output of the counter of pulses of the packet of the signal reflected from the target is compared to the code of the duration of the pulse packet of the signal reflected from the target, which is set by the comparator's switches. The logical circuit for forming a target simulating signal further includes a switching circuit whose input is connected to the output of the code comparison circuit of the logical circuit for forming a signal corresponding to the distance between the target and object. The enabling input of the switching circuit is connected to the output of the azimuth comparator; the inhibiting input of the switching circuit is connected to the output of the comparator of the duration of the pulse packet of the signal reflected from the target; the output of the switching circuit is the output of the third logical circuit and the output of the whole target simulator.

Users of the foregoing simulator of targets moving in relation to a moving object must calculate in advance the paths followed by the target and object, relative polar coordinates of targets for each scanning cycle of the radar with due regard for the motion of the targets, and the period during which the target is tracked. The foregoing data is then to be entered in the comparator with the aid of the switches, which makes it difficult to grasp all the changes in the target's path, as well as changes in the situation represented on the radar's display or the situation display of a collision avoidance system.

OBJECTS OF THE INVENTION

It is an object of the present invention to make it possible to simulate a moving target with due regard for the motion of the object.

It is another object of the invention to make it possible to simulate a target with due regard for its attitude in relation to the object.

It is still another object of the invention to make it possible to simultaneously simulate a number of individual targets.

It is yet another object of the invention to make it possible to use the proposed target simulator for navigation training.

SUMMARY OF THE INVENTION

The present invention essentially consists in providing a simulator of a target which moves in relation to a moving object, comprising a synchronization means for forming signals corresponding to the variable azimuth of space scanned by radar installed at the object and to the variable distance of scanned space points; and a channel for forming a target simulating signal. The channel includes a logical circuit for forming a pulse signal whose time position in relation to a respective reference pulse corresponds to the azimuth of the target; and a logical circuit for forming a pulse signal whose time position in relation to a respective reference pulse corresponds to the distance to the target, the two logical circuits being connected to the synchronization means; and a logical circuit for forming a target simulating signal. The target simulator includes, in accordance with the invention, a group of transducers to produce signals carrying information on the course and speed of the object, said group of transducers being connected to the channel for forming a target simulating signal. The channel includes a group of transducers to produce signals carrying information on the true course and actual speed of the target and the coordinates of the starting point of the target's movement relative to the object; and a computer to form signals carrying information on the azimuth of and the distance to the target, whose inputs are connected to the outputs of both groups of transducers, and whose outputs are electrically coupled to the first two logical circuits.

It is preferable that the target simulator should include a transducer, to produce a signal carrying information on the width of the directional pattern of the radar's antenna, connected to the channel for forming a target simulating signal. The computer should also include a unit for forming signals corresponding to the azimuth of and the distance to a first terminal point of the target scanned from the object in the direction of the target's movement and a unit for forming signals corresponding to the azimuth of and the distance to a second terminal point of the target, their outputs being connected to first inputs of a unit for forming signals carrying information on the parameters of a signal reflected from the target with due regard for the target's attitude in relation to the object. Second inputs of the target attitude signal unit are respectively connected to the transducer for forming a signal carrying information on the directional pattern width of the radar's antenna, to the output of the logical circuit for forming a target simulating signal, and to the output of the logical circuit for forming a pulse signal whose time position in relation to a respective reference pulse corresponds to the azimuth of the target. The outputs of the unit for forming signals carrying information on the parameters of a signal reflected from the target with due regard for the target's attitude relative to the object are connected to the input of the logical circuit for forming a pulse signal whose time position in relation to a respective reference pulse corresponds to the azimuth of the target, to the input of the logical circuit for forming a pulse signal whose time position in relation to a respective reference pulse corresponds to the distance to the target, and to the input of the logical circuit for forming a target simulating signal, the group of transducers of the channel includes a transducer for forming a signal carrying information on the length of the target, which is connected to the unit for forming signals corresponding to the azimuth of and the distance to the second terminal point of the target.

It is preferable for the unit for forming signals carrying information on the parameters of a signal reflected from the target with due regard for the target's attitude in relation to the object should include a phase analysis circuit to analyze the phases of signals corresponding to the azimuths of the terminal points of the target, the inputs of said phase analysis circuit being connected to the computer and combined with first inputs of a commutator. Second inputs of the commutator are respectively connected to the output of the signal phase analysis circuit and the computer. A first of the commutator's outputs is connected to the logical circuit for forming a pulse signal whose time position in relation to a respective reference pulse corresponds to the azimuth of the target, and the first and second of the commutator's outputs are connected to a circuit for finding the difference between the signals corresponding to the azimuths of the terminal points of the target. The output of said difference circuit is connected to a first input of a first adder whose second input is connected to the transducer for forming a signal carrying information on the directional pattern width of the radar's antenna, the output of said first adder being connected to the logical circuit for forming a target simulating signal. Other outputs of the commutator are conne4cted to a circuit for finding the difference between signals corresponding to the distances to the terminal points of the target, whose output is connected to an integrator. The integrator has control inputs respectively connected to the logical circuit for forming a pulse signal whose time position in relation to a respective reference pulse corresponds to the azimuth of the target, and to the logical circuit for forming a target simulating signal, the integrator's output being connected to a first input of a second adder. A second input of the second adder is connected to one of the inputs of the circuit for finding the difference between signals corresponding to the distances to the terminal points of the target, the second adder's output being connected to the logical circuit for forming a pulse signal whose time position in relation to a respective reference pulse corresponds to the distance between the object and the target.

In order to simulate a number of targets, the proposed target simulator must include n—1 channels for forming signals simulating respective targets, where n is the number of targets. The inputs of said n—1 channels are placed in parallel with the inputs of the channel for forming a target simulating signal, the outputs of all the channels being connected to a logical OR circuit.

According to one of the objectives of the present invention, it is necessary that the target simulator should include a transducer connected to the synchronization means and intended to form signals carrying information on the angular position of the radar's antenna. To this transducer there is connected a display connected to the logical OR circuit, the group of transducers for forming signals carrying information on the course and speed of the object, and the synchronization means.

BRIEF DESCRIPTION OF THE DRAWINGS

Other objects and advantages of the present invention will become more apparent from the following detailed description of preferred embodiments thereof to be read in conjunction with the accompanying drawings, wherein.

DETAILED DESCRIPTION OF THE INVENTION

The proposed simulator of a target moving in relation to an object comprises a synchronization means 1 (FIG. 1), a group 2 of transducers intended to form signals carrying information on the course and speed of the object (hereinafter referred to as the object transducer), and a channel 3 for forming a target simulating signal. The channel 3 comprises a group 4 of transducers intended to form signals carrying information on the true course and the actual speed of the target and the coordinates of the starting point of the target's movement relative to the object (hereinafter referred to as the target transducer). The group 4 of transducers is connected with its outputs 5, 6, 7 and 8 to first inputs of a computer 9 whose second inputs are inputs of the channel 3 and are connected to outputs 10 and 11 of the group 2 of transducers. An output 12 of the computer 9 is connected to an input of a logical circuit 13 for forming a pulse signal whose time position in relation to a respective reference pulse corresponds to the azimuth of the target (hereinafter referred to as the target azimuth pulse former). An output 14 of the computer 9 is connected to an input of a logical circuit 15 for forming a pulse signal whose time position in relation to a respective reference pulse corresponds to the distance to the target (hereinafter referred to as the target distance pulse former). Other inputs of the logical circuits 13 and 15, which are inputs of the channel 3, are connected to outputs 16 and 17, respectively, of the synchronization means 1. Outputs of the logical circuits 13 and 15 are respectively connected to inputs 18 and 19 of a logical circuit 20 for forming a target simulating signal (hereinafter referred to as the target simulator signal former). An output 21 of the logical circuit 20 is the output of the channel 3 and the output of the target simulator.

According to an alternative embodiment, the proposed target simulator includes a transducer 22 (FIG. 2) for forming a signal carrying information on the directional pattern width of the antenna of radar installed at the object (hereinafter referred to as the antenna transducer).

Figure 2:
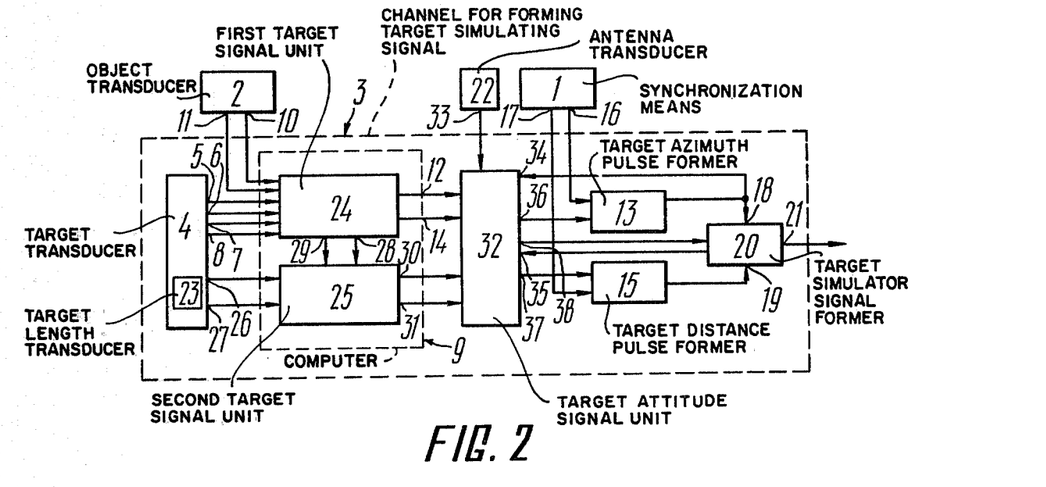
FIG. 2 is a block diagram of a target simulator producing a signal which simulates a target with due regard for the target's attitude in relation to the object, in accordance with the invention.

The group 4 of target transducers includes a transducer 23 for forming a signal carrying information on the length of the target. The computer 9 includes a first target signal unit 24 for forming signals corresponding to the azimuth of and the distance to a first terminal point of the target viewed from the object in the direction of the target's movement. First inputs of the unit 24 are connected to the outputs 5, 6, 7 and 8 of the group 4 of transducers, and second inputs are the inputs of the computer 9 and are connected to the outputs 10 and 11 of the group 2 of object transducers.

The computer 9 further contains a second target signal unit 25 for forming signals corresponding to the azimuth of and the distance to a second terminal point of the target. First inputs of the unit 25 are connected to outputs 26 and 27 of the group 4 of transducers, and second inputs of the unit 25 are connected to outputs 28 and 29 of the unit 24. Outputs 30 and 31 of the unit 25 and outputs of the unit 24, which are the outputs 12 and 14 of the computer 9, are connected to inputs of a unit 32 for forming signals carrying information on the parameters of a signal reflected from the target with due regard for the target's attitude (hereinafer referred to as the target attitude signal unit). Another input of the unit 32, which is an input of the channel 3, is connected to an output 33 of the antenna transducer 22. An input 34 of the unit 32 is connected to the output of the logical circuit 13. An input 35 of the unit 32 is connected to the output of the logical circuit 20. Outputs 36, 37 and 38 of the unit 32 are connected to the inputs of the logical circuits 13, 15, and 20, respectively.

Figure 3A:
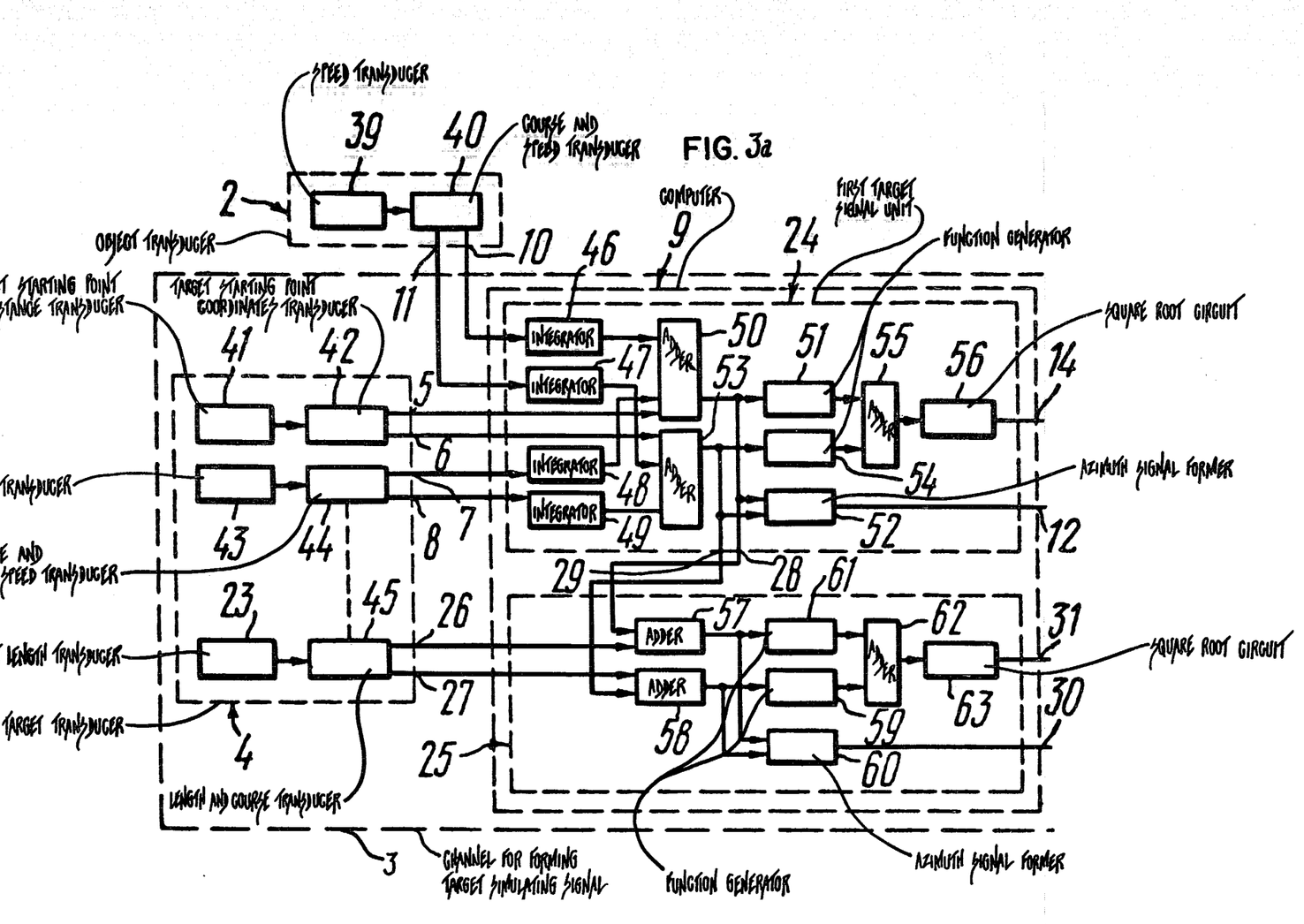
FIGS. 3a, 3b and 3c are a block diagram of a target simulator, in accordance with the invention, showing the components of each of the main elements of the circuit.
Figure 3B:
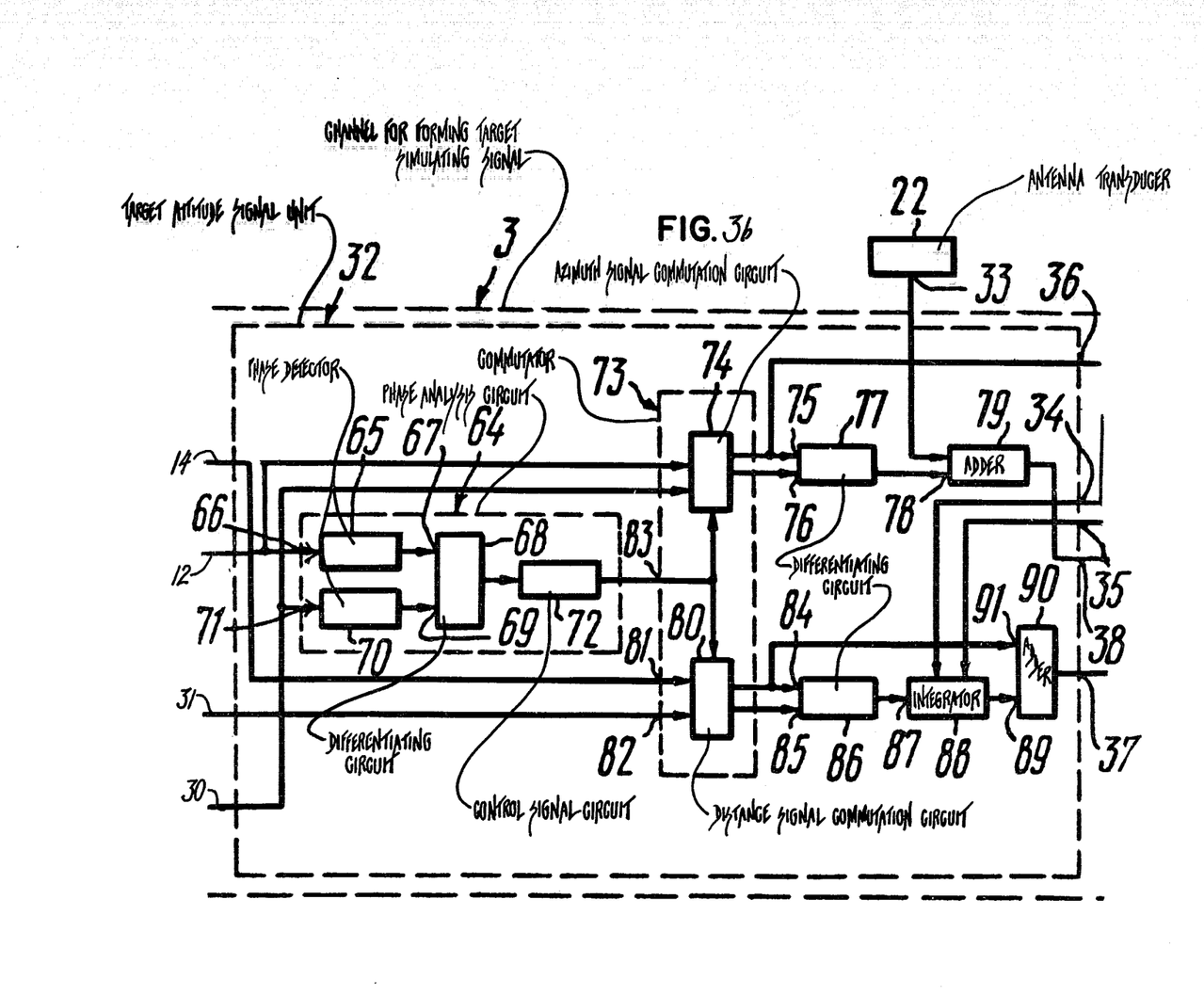
Figure 3C:
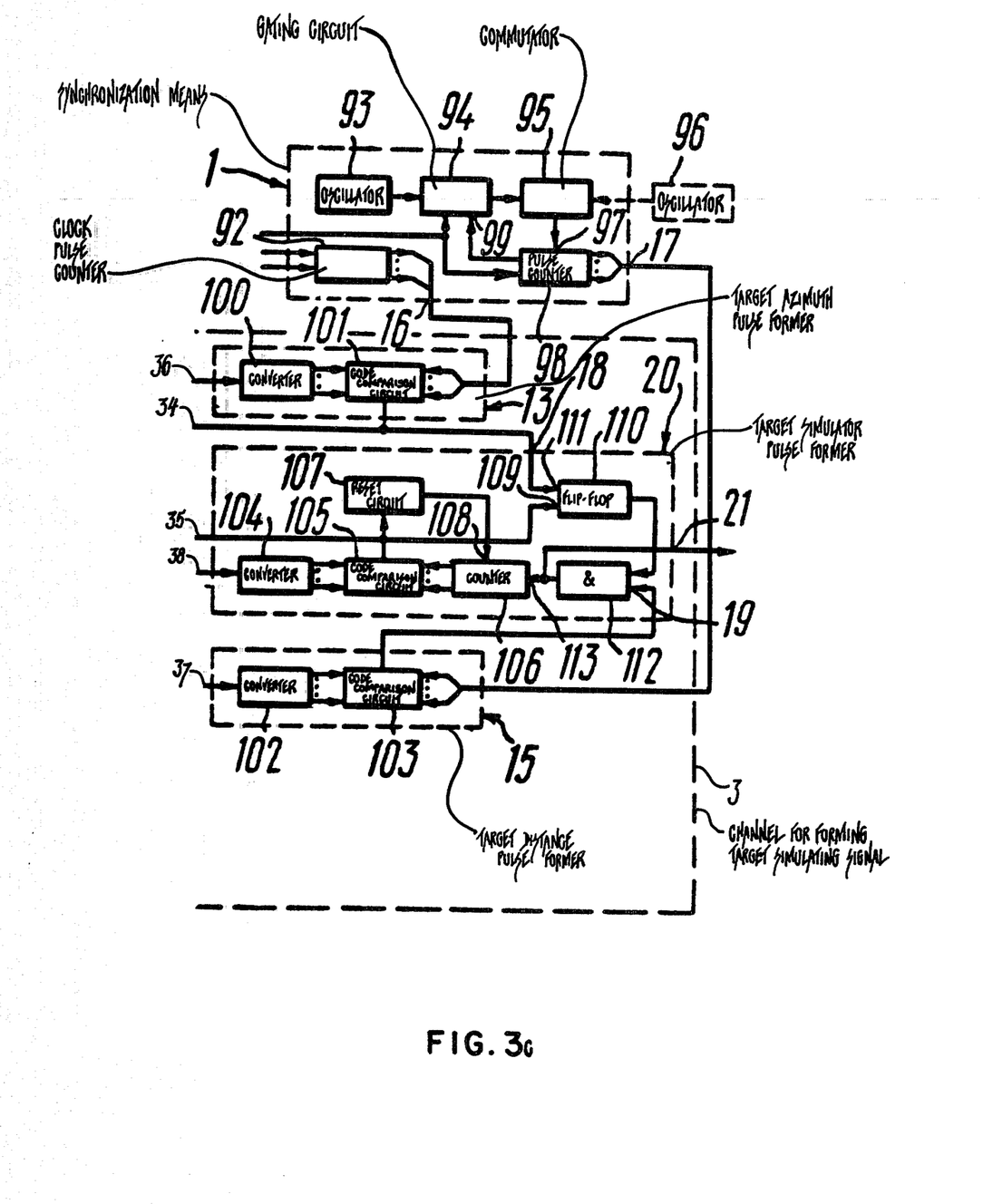

FIGS. 3a, 3b and 3c are a block diagram of the proposed target simulator. The group 2 of object transducers includes a transducer 39 for forming a signal corresponding to the speed of the object, which is connected to a transducer 40 for forming signals carrying information on the course and speed of the object. Outputs of the transducer 40 are the outputs 10 and 11 of the group 2 of transducers.

Referring now to FIG. 3a, the group 4 target transducers of the channel 3 includes a transducer 41 for forming a signal corresponding to the distance to the starting point of the target's movement relative to the object, which is connected to a transducer 42 for forming signals carrying information on the coordinates of the starting point of the target's movement relative to the object. Outputs of the transducer 42 are the outputs 5 and 6 of the group 4 of transducers. The group 4 of transducers further includes a transducer 43 for forming a signal corresponding to the actual speed of the target, which is connected to a transducer 44 for forming signals carrying information on the true course and actual speed of the target. Outputs of the transducer 44 are the outputs 7 and 8 of the group 4 of transducers. The group 4 of transducers still further includes a transducer 23 for forming signals carrying information on the length and the true course of the target, which is electrically coupled to the transducer 23 and mechanically coupled to the transducer 44. Outputs of the transducer 45 are the outputs 26 and 27 of the group 4 of transducers.

The first target signal unit 24 contains integrators 46 and 47 whose inputs are respectively connected to outputs of the transducer 40. The unit 24 also contains integrators 48 and 49 whose inputs are respectively connected to outputs of the transducer 44. Outputs of the integrators 46 and 48 and the output 5 of the transducer 42 are connected to respective inputs of an adder 50 whose output is connected to a square-law function generator 51 and an azimuth signal former unit 52 for forming a signal corresponding to the azimuth of one of the terminal points of the target. The output of the adder 50 is also the output 28 of the unit 24. Outputs of the integrators 47 and 49 and the output 6 of the transducer 42 are combined with inputs of an adder 53 whose output is connected to a square-law function generator 54 and the unit 52. The output of the adder 53 is also the output 29 of the unit 24. The unit 24 also includes an adder 55 whose inputs are connected to the outputs of square-law function generators 51 and 54, and whose output is connected to a circuit 56 for forming a signal whose voltage magnitude corresponds to the square root of the voltage magnitude of the input signal.

The second target signal unit 25 includes an adder 57 whose first input is connected to the output of the adder 50, and whose second input is connected to the output 26 of the transducer 45. The output 27 of the transducer 45 and the output of the adder 53 are respectively connected to inputs of an adder 58 whose output is connected to a square-law function generator 59 and a first input of a unit 60 for forming a signal corresponding to the azimuth of the second terminal point of the target. A second input of the unit 60 is combined with an input of a square-law function generator 61 and connected to the output of the adder 57. An output of the unit 60 is the output 30 of the unit 25. The unit 25 further includes an adder 62 whose inputs are respectively connected to the outputs of the square-law function generators 61 and 59. The output of the adder 62 is connected to a circuit 63 for forming a signal whose voltage magnitude corresponds to the square root of the voltage magnitude of the input signal. The output of the circuit 63 is the output 31 of the unit 25.

Referring now to FIG. 3b, the target attitude signal unit 32 comprises a phase analysis circuit 64 intended to analyze the phases of signals corresponding to the azimuths of the terminal points of the target. The circuit 64 includes a phase detector 65 whose input is an input 66 of said circuit 64 and is connected to the output 12 to the unit 52; the output of the phase detector 65 is connected to an input 67 of a difference circuit 68 for finding the difference between the phases of signals corresponding to the azimuths of the terminal points of the target. An input 69 of the circuit 68 is connected to an output of a phase detector 70 whose input is an input 71 of the circuit 64 and is connected to the output 30 of the unit 60. An output of the circuit 68 is connected to a circuit 72 for forming a control signal for a commutator 73.

The commutator 73 comprises a signal commutation circuit 74 for commutating signals corresponding to the azimuths of the terminal points of the target. Inputs of said circuit 74 are combined with the inputs 66 and 71, respectively, of the circuit 64. Outputs of the commutation circuit 74, one of which is the output 36 of the unit 32, are connected to inputs 75 and 76 of a azimuth difference circuit 77 for finding the difference between signals corresponding to the azimuths of the terminal points of the target. An output of the circuit 77 is connected to an input 78 of an adder 79 whose second input is connected to the output 33 of the antenna transducer 22; an output of the adder 79 is the output 38 of the unit 32. The commutator 73 also includes a signal commutation circuit 80 for commutating signals corresponding to the distances to the terminal points of the target. Inputs of said circuit 80 are inputs 81 and 82 of the commutator 73 and are connected to the output 14 of the circuit 56 and the output 31 of the square root circuit 63 of the computer 9. Control inputs of the signal commutation circuits 80 and 74 are combined and serve as a control input 83 of the commutator 73, which an output of the control signal forming circuit 72 is connected. Outputs of the commutation circuit 80 are connected to inputs 84 and 85 of a distance difference circuit 86 for finding the difference between signals corresponding to the distances to the terminal points of the target. An output of the circuit 86 is connected to an input 87 of an integrator 88. Control inputs of the integrator 88 are the inputs 34 and 35 of the target attitude signal unit 32. An output of the integrator 88 is connected to an input 89 of an adder 90 whose input 91 is connected to one of the outputs of the signal commutation circuit 80; it may also be connected to another output of said circuit 80. An output of the adder 90 is the output 37 of the signal forming unit 32.

Referring now to FIG. 3c, the synchronization means 1 comprises a clock pulse counter 92 whose inputs are connected to a reference pulse unit (not shown) and a clock pulse unit (not shown). Outputs of the counter 92 are connected to the outputs 16 of the synchronization means 1. The synchronization means further includes a high-frequency internal master oscillator 93 whose output is connected to an input of a gating circuit 94 for gating signals produced by the internal master oscillator 93. An output of the circuit 94 is connected to a first input of a commutator 95 whose second input is connected to an external master oscillator 96. An output of the commutator 95 is connected to a counting input 97 of a pulse counter 98 for counting pulses produced by the master oscillators 93 or 96. One output of the pulse counter 98 is connected to an inhibiting input 99 of the gating circuit 94, and its other outputs are the outputs 17 of the synchronization means 1. The enable input of the gate circuit 94 and the setting input of the counter 98 are combined and connected to the reference pulse transmitter (not shown).

The target azimuth pulse former 13 includes a converter 100 of the voltage of a signal, corresponding to the azimuth of the first target point surveyed by the radar, to a respective code. Outputs of the voltage converter 100 are connected to first inputs of a code comparison circuit 101 whose second inputs are connected to the output of the counter 92. An output of the code comparison circuit 101 is connected to the control input 34 of the integrator 88.

The target distance pulse former 15 comprises a converter 102 of the voltage of a signal, corresponding to the variable distance to the points of the target with due regard for the target's attitude and length, to a respective code. Outputs of the converter 102 are connected to first inputs of a code comparison circuit 103 whose second inputs are connected to outputs of the counter 98.

The target simulator signal former 20 comprises a converter 104 of the voltage of a signal, corresponding to the duration of a signal reflected from the target, to a respective code. Outputs of the converter 104 are connected to first inputs of a code comparison circuit 105 whose second inputs are connected to a counter 106 of the number of pulses of the signal reflected from the target. An output of the code comparison circuit 105 is connected to the control input 35 of the integrator 88 and to an input of a reset circuit 107. The output of the reset circuit 107 is connected to a set input 108 of the counter 106 and a reset input 109 of a flip-flop 110. The set input 111 of the flip-flop 110 is the input 18 of the logical circuit 20 and is connected to an output of the code comparison circuit 101. An output of the flip-flop 110 is connected to a first input of a logical AND circuit 112 whose second input is the input 19 of the logical circuit 20 and is connected to an output of the code comparison circuit 103. An output of the logical AND circuit 112 is connected to a counting input 113 of the counter 106 and is the output 21 of the logical circuit 20, and the output of the channel 3 and target simulator.

The proposed multichannel target simulator additionally includes channels $114_1$ ..., $114_{n-1}$ (FIG. 4) for forming target simulating signals, n being the number of targets. Inputs of said channels $114_1$, ..., $114_{n-1}$ are placed in parallel with the respective inputs of the channel 3. Outputs $115_1$, ..., $115_{n-1}$ of each of the channels $114_1$, ..., $114_{n-1}$ and the output 21 of the channel 3 are connected to the inputs of a logical OR circuit 116 whose output serves as the output of the target simulator.

The multichannel target simulator which is used to train navigators comprises a transducer 117 (FIG. 5) to form signals carrying information on the angular position of the radar's antenna. An output 118 of the transducer 117 is connected to an input of the synchronization means 1, and its output 119 is connected to an input of a display 120. A video signal input 121 of the display 120 is connected to the output of the logical OR circuit 116. An input 122 of the display 120 is connected to a transducer 123 forming a signal corresponding to the course of the object. The transducer 123 is mechanically coupled to the course and speed transducer 40. An input 124 of the display 120 is connected to the transducer 39. Outputs 125 and 126 of the display 120 are connected to inputs of the synchronization means 1.

Figure 1:
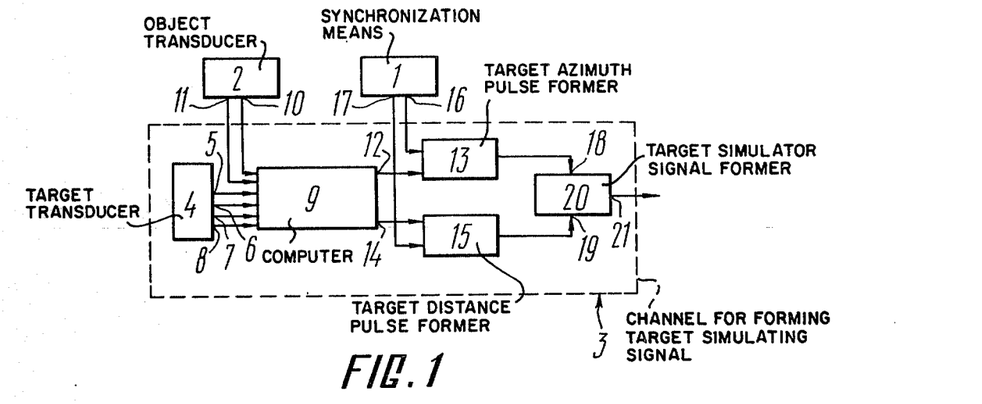
FIG. 1 is a block diagram of a target simulator in accordance with the invention.

Operation of one of the preferred embodiments of the target simulator in accordance with the invention will be explained with reference to the block diagram of FIG. 1.

The operating principle of the proposed simulator of a target moving in relation to a moving object is as follows. At each moment of time, by signals corresponding to the travel parameters of the target and object there are calculated the coordinates of the target in relation to the object, which coordinates are then converted to pulses whose time position relative to the reference pulses corresponds to the relative target coordinates, whereupon a packet of pulses of the signal reflected from the target is produced. Travel parameters of the target and object are set with the aid of the groups 2 and 4 of transducers.

The group 2 of object transducers forms signals carrying information on the course and speed of the object, for example, signals corresponding to orthogonal components of the velocity vector turned through an angle of 180°, one of which is directed, for example, along the meridian.

The group 4 of target transducers forms signals carrying information on the coordinates of the starting point of the target's travel in relation to the object and on the true course and actual speed of the target, for example, in the form of orthogonal coordinates of the starting point and orthogonal projections of the velocity vector, one of which is directed, for example, along the meridian. As signals from the groups 2 and 4 of transducers are applied to the inputs of the computer 9, the computer produces signals carrying information on the azimuth of and the distance to the target. This is done as follows: the computer 9 integrates signals corresponding to the orthogonal projections of the velocity vectors of the target and object, and adds together signals corresponding to each component coordinate of the starting point of the target and projections of the paths followed by the target and object, whereby there are produced signals corresponding to the orthogonal coordinates of the target relative to the object, which are then converted to signals, one of which corresponds to the polar coordinate of the target's azimuth and is formed at the output 12 of the computer 9, and the other of which corresponds to the polar coordinate of the distance to the target and is formed at the output 14.

The synchronization means 1 produces signals one of which, formed at the output 17, corresponds to the distance variable within the period of space scanned by the radar installed at the object and the other of which, formed at the output 16, corresponds to the azimuth variable within the period of the scanned space. Reference range and azimuth count pulses may arrive from reference pulse generators (not shown) at the synchronization means 1.

The target azimuth pulse former 13 compares the signals corresponding to the azimuth of the target and the variable azimuth of points of the space scanning direction and, at the moment of comparison, produces a pulse whose timing is in relation to the reference azimuth of the target. This pulse is the output signal of the logical circuit 13.

Similarly, the target distance pulse former 15 produces a pulse whose timing in relation to the reference distance calculation pulse corresponds to the distance between the object and target. This pulse is the output signal of the logical circuit 15.

As a pulse from the logical circuit 13 arrives at the input 18 of the target simulator signal former 20, the former 20 counts a predetermined number of pulses applied to its input 19 from the logical circuit 15 and thus produces a target simulating signal.

In the proposed target simulator, the initial data includes the parameters of the true motion of the target, and only the parameters of the starting point of the target's motion are set in relation to the object. This accounts for the simplicity of controlling the target's path, especially under conditions when a maneuver of the target and object is simulated, for which purpose it is sufficient to change the value of the required target or object motion parameter with reference to the scale of the respective transducer (the course or speed transducer).

When a target simulating signal is applied to the display (not shown), the target is shown on the display as an arc of a constant radius. If the target has a great length and is close to the object, its blip increases in size and is oriented in the direction of the target's course.

Operation of an alternative embodiment of the present invention, which makes it possible to automatically change the size and orientation of the target blip, is explained with reference to the block diagram shown in FIGS. 3a, 3b and 3c.

The speed transducer 39 of the group 2 of object transducers may be, for example, a potentiometer or a rotating line transformer. The transducer 39 produces a signal whose voltage magnitude corresponds to the magnitude of a specified speed of the object. The cause and speed transducer 40 may be, for example, a sine-cosine rotating transformer and produces two signals corresponding to orthogonal projections of the speed vector turned through an angle of 180°, one of which is directed, for example, along the meridian. The scale of the transducer 39 is graduated in speed units, whereas the scale of the transducer 40 is graduated in course calculation units.

The target starting point distance and coordinates transducers 41 and 42 of the group 4 of target transducers, which are interconnected and are similar to the transducers 39 and 40, produce respective signals. The voltage magnitude of one of these signals corresponds to a specified distance to the starting point of the target's motion; the voltage magnitudes of the other signals correspond to the orthogonal coordinates of the starting point of the target's motion, one of which is directed, for example, along the meridian. The scale of the transducer 41 is graduated in distance units, whereas the scale of the transducer 42 is graduated in azimuth calculation units. The speed and speed and course transducers 43 and 44, which are interconnected and are similar to the transducers 39 and 40, produce respective signals. The voltage magnitude of one of these signals corresponds to the actual speed of the target; the voltage magnitudes of the other signals correspond to the orthogonal projections of the velocity vector with due regard for the true course of the target, one of which is directed, for example, along the meridian. The scales of the transducers 43 and 44 are graduated as those of the transducers 39 and 40.

The target length transducer 23 is similar to the transducer 39 and produces a signal whose voltage magnitude corresponds to the length of the target.

The transducers 44 and 45 may be similar to each other, may be mechanically interconnected and may have one common scale. The transducer 45 produces two signals corresponding to orthogonal projections of a line segment whose length is equal to that of the target and which is oriented in the true target course direction; one of the projections is directed, for example, along the meridian.

In the first target signal unit 24, the output signals of the transducers 40 and 44 are integrated by the integrators 46, 47, 48 and 49, respectively, which produce signals corresponding to orthogonal projections of the path followed by the target and object. The output signals of the integrators 46, 47, 48 and 49 and the output signals of the transducer 42 are added by the adders 50 and 53. At the outputs of said adders 50 and 53 there are formed signals corresponding to orthogonal coordinates of one of the terminal points of the target, for example, the stern of a vessel. The orthogonal coordinates of the target are then transferred into polar coordinates.

In order to calculate the distance to the target, the voltage magnitude of the output signals of the address 50 and 53 is raised to the second power by the square-law function generators 51 and 54, respectively, whose output signals are added by the adder 55. From the sum total of the squares of the voltages of the signals corresponding to the orthogonal coordinates of the target, the square root circuit 56 extracts the square root. The voltage magnitude of the output signal of the circuit 56 corresponds to the distance to one of the terminal points of the target, i.e. the stern.

In order to calculate the azimuth of the target, the output signals of the adders 50 and 53 are applied to the azimuth signal former 52 for forming a signal corresponding to the azimuth of the stern. The unit 52 may be a servosystem, wherein the shaft rotation angle corresponds to the arc tangent of the quotient of the division of values corresponding to the orthogonal coordinates of the target. The unit 52 also includes a transducer mechanically coupled to the shaft of the servosystem and producing a signal corresponding to the azimuth of the target's stern.

In the second target signal unit 25, the adders 57 and 58 add respectively, the signals corresponding to the orthogonal coordinates of the target's stern and arriving from the outputs 28 and 29 of the signal unit 24, and the signals corresponding to the orthogonal projections of the vessel's length and arriving from the outputs 26 and 27 of the group 4 of target transducers. At the outputs of the adders 57 and 58 there are produced signals corresponding to the orthogonal coordinates of the other terminal point of the target, i.e. the vessels's bow. Said orthogonal coordinates may be transformed to polar coordinates as was done by the signal unit 24.

In this manner, the computer 9 produces signals corresponding to the coordinates of both terminal points of the target, i.e. the bow and stern, in relation to the object. At the outputs 12 and 14 of the unit 24 there are formed signals corresponding to the azimuth of and the distance to the stern of the target; at the outputs 30 and 31 of the unit 25 there are formed signals corresponding to the azimuth of and the distance to the bow of the target.

The target attitude signal unit 32 analyzes the vessel's position, and each of the terminal points of the target is scanned by the radar in advance, for which purpose the signals, arriving from the outputs 12 and 30 of the computer 9 at the inputs 66 (FIG. 3b) and 71 of the signal phase analysis circuit 64, are applied to the phase detectors 65 and 70 whose output signals correspond to the phase of the input signals and are applied to the inputs 67 and 69 of the phase difference circuit 68. The output signal of the circuit 68 is applied to the circuit 72 for forming a control signal for the commutator 73. The circuit 72 may be a zero-crossing detector whose output signal changes abruptly following a change in the sign of the phase difference. The control signal is formed so that at the output of the commutation circuit 74 there is produced a signal corresponding to the (lesser) azimuth of that terminal point of the target which is the first to be scanned by the radar. The output signal of the commutator 73 is applied to the input 75 of the circuit 77. To the input 76 of said circuit 77 there is applied another output signal of the commutator 73, corresponding to the (greater) azimuth of the second terminal point of the target, which is the last to be scanned by the radar. The output signal of the circuit 77, corresponding to the difference between the greater and lesser azimuths of the terminal points of the target, is applied to the input 78 of the adder 79 which arithmetically adds it to the output signal of the antenna transducer 22 applied to the input of the adder 79 and carrying information on the directional pattern width of the radar's antenna, for example, the width of the main lobe of the antenna's directional pattern at a 50 percent input. The voltage magnitude of the output signal of the adder 79 corresponds to the angular width of the signal reflected from the target, or, in terms of time, to the duration of that signal. The commutation circuit 80 switches the inputs 81 and 82 of the commutator 73 in such a way, for example, that to the inputs 84 and 85 of the distance difference circuit 86 there are always applied signals corresponding to the distance to the terminal points of the target, which are the first and last to be scanned by the radar. The signal corresponding to the distance to the first and last terminal points of the target is applied to the input 87 of the integrator 88 which forms a signal corresponding to a change in the distance to the points of the target successively scanned by the radar, beginning with the first and ending with the last point. The start of integration is determined by the arrival at the input of the integrator 88 of a pulse produced by the target azimuth pulse former 13, whose time position corresponds to the azimuth of the leading edge of the signal reflected from the target, i.e. to the azimuth of the point of the target, which is the first to be scanned by the radar. The end of integration corresponds to a moment when to the input of the integrator 88 there is applied a pulse produced by the target simulator pulse former 20 and corresponding to the trailing edge of the signal reflected from the target.

The output signal of the integrator 88 is applied to the input 89 of the adder 90 and added to the signal corresponding to the distance to the point which is the first to be scanned by the radar, which is applied to the input 91.

Thus at the outputs of the unit 32 the following signals are produced: at the output 36 there is produced a signal whose voltage magnitude corresponds to the azimuth of the target's terminal point which is the first to be scanned by the radar; at the output 37 there is produced a signal whose voltage magnitude corresponds to the distances to all points of the target, from the first to the last, as said points are successively scanned by the radar, with due regard for the target's attitude in relation to the object and at the output 38 there is produced a signal whose voltage magnitude corresponds to the duration of the signal reflected from the target with due regard for the length of the target, its attitude towards the object, and the directional pattern width of the radar's antenna.

The counter 92 of the synchronization means 1 counts the clock pulses arriving from the transducer (not shown), beginning with the arrival of the reference azimuth calculation pulse. At the outputs of the counter 92 there is produced a signal which is an azimuth code variable during the scanning cycle of the radar. Output pulses of the high-frequency master oscillator 93, whose repetition period corresponds, for example, to one fortieth of the nautical mile, are applied to the gating circuit 94. The gating circuit enables the passage of said pulses to the counting input 97 of the counter 98 via the commutator 95, beginning with the arrival at the enable input of said gating circuit 94 of the reference range calculation pulse, and inhibits the passage of said pulses to the counting input 97 of the counter 98 beginning with the arrival at the inhibiting input 99 of said gating circuit 94 of an output signal of the counter 98, corresponding, for example, to a preset count limit in the counter 98. In the presence of the external master oscillator 96, the output pulses of the oscillator 96 are applied to the counting input 97 of the counter 98, which is done via the commutator 95. At the outputs of the counter 98 there is produced a signal which is a variable range code acting during the radar scanning period.

The target azimuth pulse former 13 operates as follows. The voltage-to-code converter 100 converts the voltage applied from the output 36 of the signal unit 32, corresponding to the azimuth of the target's point which is the first to be scanned by the radar, to a code which is compared by the code comparison circuit 101 with the variable azimuth code applied from the output of the counter 92. At a moment the codes are equal, at the output of the comparison circut 101 there is produced a pulse whose time position in relation to the reference azimuth calculation pulse corresponds to the azimuth of the leading edge of the signal reflected from the target, which pulse is applied to the input 111 of the flip-flop 110.

The target distance pulse former 15 operates in a manner similar to that of the logical circuit 13; at the output of the logical circuit 15 there is produced a pulse whose time position in relation to the reference range calculation pulse corresponds to the distances to the points of the target successively viewed by the radar.

The pulse applied to the input 111 sets the flip-flop 110 of the target simulator pulse former 20; the signal at the direct output of said flip-flop 110 enables the passage through the logical AND circuit 112 of the pulse arriving from the output of the code comparison circuit 103, which is the output of the logical circuit 15, to the counting input 113 of the counter 106. The output signal of the counter 106 is a code corresponding to the number of pulses of the packet of the signal reflected from the target; this output signal is applied to the code comparison circuit 105 which compares it to the code of the duration of the signal reflected from the target, which code is produced at the outputs of the converter 104 converting to the code the voltage of a signal arriving from the output 38 (FIG. 2) of the signal unit 32. At a moment the output signal of the circuit 105 is applied to the integrator 88, the integrator 88 discontinues the integration of signals, and the flip-flop 110 is reset. The output signal of the circuit 105 is then applied to the input of the reset circuit 107 whose output signal is applied to the set input 108 of the counter 106 and sets it; the output signal of the flip-flop 110 inhibits the passage through the logical AND circuit 112 of pulses arriving from the output of the code comparison circuit 103 at the counting input 113 of the counter 104. The output of the logical AND circuit 112 is also the output 21 of the logical circuit 20, the output of the channel 3, and the output of the target simulator.

The proposed target simulator is operated as follows. On the scales of the speed and speed course transducers 39 and 40, parameters of the object's motion are set; on the scale of the antenna transducer 22 the width of the directional pattern of the radar's antenna is set; at a moment the target is detected, on the scales of the transducers of the target group 4 there are set the parameters of the starting point of the target's motion, the target's length and its motion. Beginning with that moment, the computer 9 calculates the coordinates of the terminal points of the target; the signal unit 32 determines the azimuth of the signal reflected from the target and the duration of that signal with due regard for the width of the directional pattern of the radars antenna, the length of the target, and the attitude of the target relative to the object; the logical circuit 20 subsequently forms a target simulating signal.

At moment of time corresponding to a maneuver of the object or target, on the scales of the transducers 39, 40, 43 and 44 of respective parameters of the motion of the target or object there are changed the specified parameters of motion, which parameters are changed by the value of the change in the course of the manuever. The orthogonal projections of the velocity vector of the target or object are changed accordingly. The target simulator senses these changes, and the target simulating signal is produced with due regard for these changes.

Figure 4:
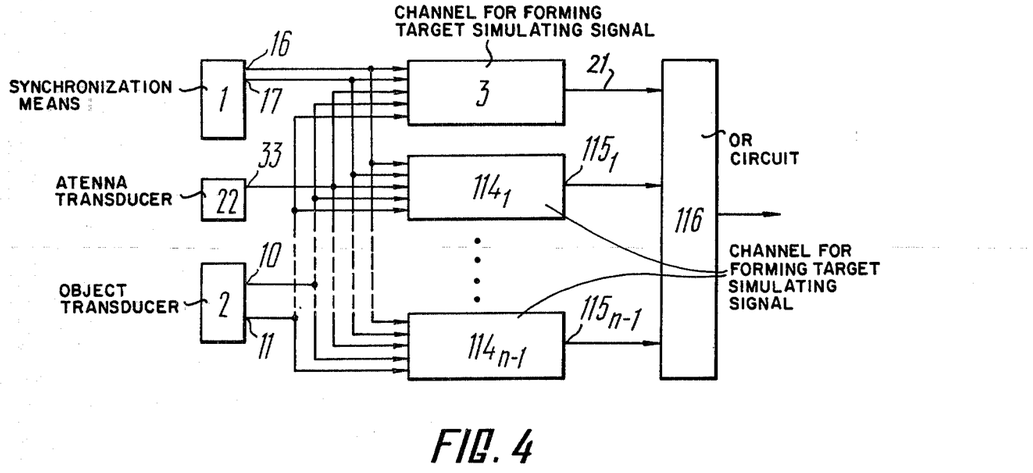
FIG. 4 is a block diagram of a multichannel target simulator in accordance with the invention.

FIG. 4 illustrates operation of a multichannel target simulator in accordance with the present invention. In actual navigation conditions, a number of targets is not an uncommon case. The proposed multichannel target simulator produces signals which simulate n targets.

To the inputs of the channels 3 and $114_1 \ldots 114_{n-1}$ there are applied the signals produced by the synchronization means 1, the antenna transducer 22, and the group 2 of object transducers. Each of the channels 3 and $114_1, \ldots, 114_{n-1}$ (FIG. 4) uses these signals and signals formed in each of said channels 3 and $114_1 \ldots, 114_{n-1}$ by the group 4 of target of transducers to form a respective target simulating signal. The output pulses of the packet of the signal reflected from the target of all the n channels 3 and $114_1, \ldots, 114_{n-1}$ are applied to the logical OR circuit 116 which produces a single output signal containing the pulses of the signals simulating all the n targets.

A multichannel target simulator in accordance with the invention, complete with the display 120 (FIG. 5), for example, a situation display of a collision avoidance system, is used to train navigators and operates as follows.

The navigator instructor uses the scale of the antenna transducer 22 (FIG. 5), which is, for example, a potentiometer or a rotating line transformer, to set the width of the directional pattern of the radar's antenna; he also uses the course and speed scales of the object transducers of the group 2 to set the course and speed of the object, i.e. the vessel to be navigated by the trainee.

The instructor also uses the scales of the group 4 of target transducers (FIG. 4) of the channels 3 and $114_1 \ldots, 114_{n-1}$ (FIG. 5) to set parameters of motion of a desired number of targets. In order to simulate a speed or course maneuver of a target or the object, the speed or course are changed by a desired value on the respective scale. The output signal of the logical OR circuit 116, containing pulses of the target simulating signals, is applied to the video signal input 121 of the display 120 and is represented as blips on the screen. From the outputs of the group 2 of transducers to the inputs 122 and 124 of the display 120 there are applied signals corresponding to the course and speed of the object. From the outputs 125 and 126 of the dispay 120 to respective inputs of the synchronization means 1 there are applied reference pulses for calculating the range and azimuth, respectively.

Figure 5:
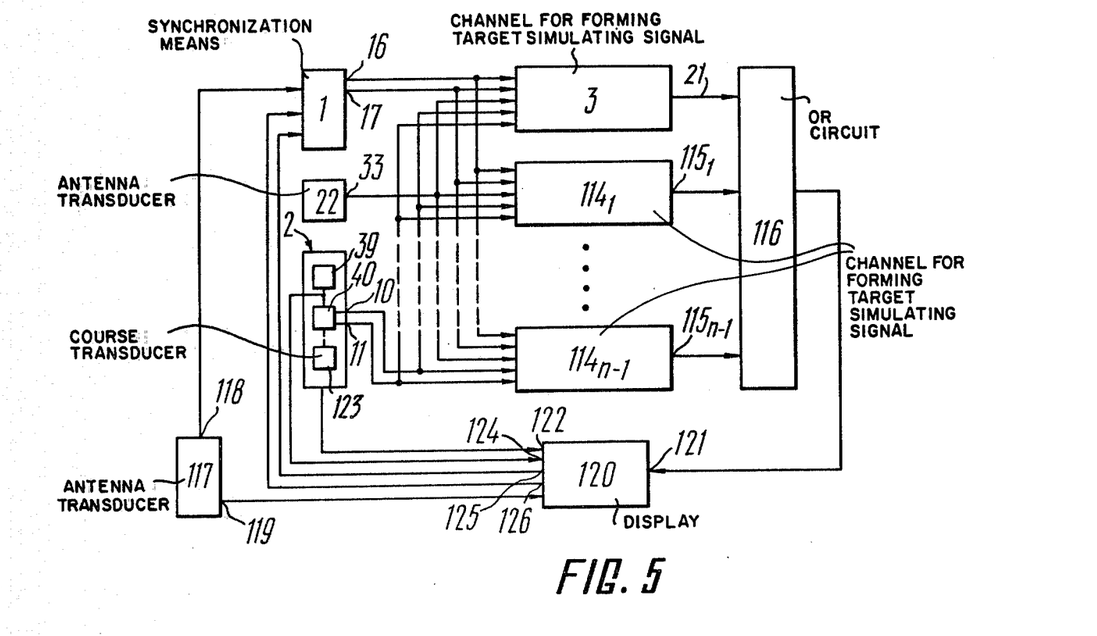
FIG. 5 is a block diagram of a target simulator used as a navigation trainer, in accordance with the invention.

The antenna transducer 117, which forms signals carrying information on the angular position of the antenna, produces at its output 119, which is connected to the display 120, a signal corresponding to the course angle of the antenna of the radar installed at the object; at its output 118, which is connected to the synchronization means 1, said transducer 117 produces clock pulses whose repetition period corresponds to a certain azimuth value.

Mutual displacement of the target blips on the screen of the display 120, with due regard for the motion of the object and changes in the attitudes, corresponds to the data set at the transducers of the groups 2 and 4 (FIG. 3) of transducers of the respective channels.

The navigator uses the display 120 as if in actual conditions. He may forecast different situations, rehearse collision avoidance maneuvers, and check the corrections of maneuvers performed. The target simulator changes the location and positioning of targets on the screen of the display 120 in accordance with the maneuvers being performed.

What is claimed is:

1. A simulator of a target which moves in relation to a moving object, comprising:

a synchronization means forming signals corresponding to the variable azimuth of the direction of space scanned by radar installed on the object and to the variable distance of scanned space points, and having first and second outputs;

a group of object transducers forming signals carrying information on the course and speed of said object, and having outputs;

a channel forming a target simulating signal and comprising a group of target transducers, a computer, a target azimuth pulse former, a target distance pulse former and a target simulator signal former;

said group of target transducers of said channel forming signals carrying information on the true course and actual speed of said target and the coordinates of the starting point of the target's motion relative to said object, and having first and second outputs;

said computer of said channel having first and second groups of inputs and first and second outputs, said first group of inputs of said computer being connected to said outputs of said group of object transducers, said second group of inputs of said computer being connected to said outputs of said group of target transducers;

said target azimuth pulse former of said channel forming a pulse signal whose timing in relation to a respective reference pulse corresponds to the azimuth of said target, and having a first input electrically connected to said first output of said computer, a second input connected to said first output of said synchronization means, and an output;

said target distance pulse former of said channel forming a pulse signal whose timing in relation to a respective reference pulse corresponds to the distance to the target, and having a first input electrically connected to said second output of said computer, a second input connected to said second output of said synchronization means, and an output; and said target simulator signal former having a first input connected to said output of said target azimuth signal former, a second input connected to said output of said target distance pulse former, and an output serving as an output of said channel and the output of the target simulator.

2. A target simulator as claimed in claim 1, further comprising:

an antenna transducer forming a signal carrying information on the width of the directional pattern of an antenna of said radar, and having an output;

wherein said computer comprises first and second target signal units;

said first target signal unit of said computer forming signals corresponding to the azimuth of and the distance to a first terminal point of said target viewed from said object in the direction of said target's motion, amnd having first and second groups of inputs and first, second, third and fourth outputs, said first group of inputs of said first target signal unit being connected to said outputs of said group of object transducers, said second group of inputs of said first target signal unit being connected to said first outputs of said group of target transducers; and said second target signal unit of said computer forming signals corresponding to the azimuth of and the distance to a second terminal point of said target, and having first, second, third and fourth inputs and first and second outputs, said first and second inputs of said second target signal unit being respectively connected to said third and fourth outputs of said first target signal unit, said third and fourth inputs of said second target signal unit being connected to said second outputs of said group of target transducers; and wherein said channel further comprises a target attitude signal unit and a target length transducer;

said target attitude signal unit forming signals carrying information on the parameters of a signal reflected from said target with due regard for the target's attitude relative to said object, and having first and second inputs respectively connected to said first and second outputs of said first target signal unit of said computer, third and fourth inputs connected to said first and second outputs of said second target signal unit of said computer, a fifth input connected to said output of said antenna transducer, a sixth input connected to a second output of said target simulator signal former, a seventh input connected to said output of said target azimuth pulse former, and first, second and third outputs respectively connected to said first input of said target azimuth pulse former, to said first input of said target distance pulse former, and to a third input of said target simulator signal former; and said target length transfer forming a signal carrying information on the length of said target, included in said group of target transducers of said channel, and being connected to said second target signal unit of said computer.

3. A target simulator as claimed in claim 2, wherein said target attitude signal unit comprises:

a signal phase analysis circuit analyzing the phases of signals corresponding to the azimuths of the terminal points of said target, and having first and second inputs respectively connected to said first outputs of said first and second target signal units of said computer, and an output;

a commutator having a first input connected to said output of said signal phase analysis circuit, second and third inputs respectively connected to said first and second inputs of said signal phase analysis circuit, fourth and fifth inputs respectively connected to said second outputs of said first and second target signal units of said computer, and first, second, third and fourth outputs;

an azimuth signal difference circuit, to find the difference between signals corresponding to the azimuths of the terminal points of said target, having a first input combined with the first output of said commutator and connected to said first input of said target azimuth pulse former, a second input connected to said second output of said commutator, and an output;

a distance signal difference circuit, to find the difference between signals corresponding to the distances to the terminal points of said target, and having first and second inputs respectively connected to said third and fourth outputs of said commutator, and an output;

a first adder having a first input connected to said output of said azimuth signal difference circuit, a second input connected to said output of said antenna transducer, and an output connected to said third input of said target simulator signal former;

an integrator having a first input connected to said output of said distance signal difference circuit, a second input connected to said output of said target azimuth pulse former, a third input connected to said second output of said target simulator signal former, and an output; and a second adder having a first input connected to said output of said integrator, a second input combined with one of said inputs of said distance signal difference circuit, and an output connected to said first input of said target distance signal former.

4. A simulator of targets which move in relation to a moving object, comprising:

a synchronization means forming signals corresponding to the variable azimuth of the direction of space scanned by radar installed on said object and to the variable distance of scanned space points, and having first and second outputs;

a group of object transducers forming signals carrying information on the course and speed of said object, and having outputs;

a first antenna transducer forming a signal carrying information on the width of the directional pattern of said radar's antenna, and having an output;

n signal forming channels, each intended to simulate a target, where n is the number of targets, each channel having inputs respectively combined and connected to said outputs of said synchronization means, of said group of object transducers, and said first antenna transducer, and an output;

wherein each of said channels comprises:

a group of target transducers forming signals carrying information on the true course and actual speed of said target and on coordinates of the starting point of the target's motion relative to said object, and having first and second outputs;

a computer having a first group of inputs connected to said outputs of said group of object transducers, a second group of inputs connected to said outputs of said group of target transducers, and first, second, third and fourth outputs; wherein said computer comprises: a first target signal unit forming signals corresponding to the azimuth of and the distance to a first terminal point of one of said targets viewed from said object in the direction of said target's motion, and having a first group of inputs connected to said outputs of said group of object transducers, a second group of inputs connected to said first outputs of said group of target transducers, first outputs respectively connected to said first and second outputs of said computer, and second outputs; and a second target signal unit forming signals corresponding to the azimuth of and the distance to a second terminal point of said target, and having first inputs connected to said second outputs of said first target signal unit, second inputs connected to said second outputs of said group of target transducers, and outputs;

a target attitude signal unit forming signals carrying information on the parameters of a signal reflected from said target with due regard for the target's length and attitude in relation to said object, and having first and second inputs connected to said outputs of said first target signal unit of said computer, third and fourth inputs connected to said outputs of said second target signal unit of said computer, a fifth input connected to said output of said first antenna transducer, sixth and seventh inputs, and first, second and third outputs;

a target azimuth pulse former forming a pulse signal whose time position in relation to a respective reference pulse corresponds to the azimuth of said target, and having a first input electrically connected to said first output of said target attitude signal unit, a second input connected to said first output of said synchronization means, and an output connected to said sixth input of said target attitude signal unit;

a target distance pulse former forming a pulse signal whose time position in relation to a respective reference pulse corresponds to the distance to said target, and having a first input electrically connected to said second output of said target attitude signal unit, a second input connected to said second output of said synchronization means, and an output; and a target simulator signal former forming a pulse signal simulating said target, and having a first input connected to said output of said target azimuth pulse former, a second input connected to said output of said target distance pulse former, a third input connected to said third output of said target attitude signal unit, a first output connected to said seventh input of said target attitude signal unit, and a second output connected to the output of said channel; and said simulator further comprising a logical OR circuit having inputs connected to said outputs of each of said n channels for forming target simulating signals, and an output serving as an output of said simulator.

5. A target simulator as claimed in claim 4, further comprising:

a second antenna transducer forming signals carrying information on the angular position of said radar's antenna, and having a first output connected to a first input of said synchronization means, and a second output; and a display having outputs connected to inputs of said synchronization means, and inputs respectively connected to outputs of said group of object transducers, said second output of said second antenna transducer, and said output of said logical OR circuit.

* * * * *